United States Patent
Wendorf et al.

(10) Patent No.: US 6,542,919 B1
(45) Date of Patent: *Apr. 1, 2003

(54) OPERATING SYSTEM FOR USE WITH PROTECTION DOMAINS IN A SINGLE ADDRESS SPACE

(75) Inventors: James W. Wendorf, Cortlandt Manor, NY (US); Kamlesh Rath, Hackensack, NJ (US); Dinesh Verma, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 08/621,760

(22) Filed: Mar. 22, 1996

(51) Int. Cl.$^7$ .................................................. G06F 9/00
(52) U.S. Cl. ........................ 709/100; 711/170; 711/163
(58) Field of Search ................................ 395/650, 417; 709/100–108; 711/1–6, 170–221, 163

(56) References Cited

U.S. PATENT DOCUMENTS

| | | | | |
|---|---|---|---|---|
| 5,280,614 A | * | 1/1994 | Munroe et al. | 709/107 |
| 5,581,722 A | * | 12/1996 | Welland | 395/417 |
| 5,845,331 A | * | 12/1998 | Carter et al. | 711/163 |
| 6,003,123 A | * | 12/1999 | Carter et al. | 711/207 |

OTHER PUBLICATIONS

Jeff Chase et al, "Opal: A Single address Space System for 64–bit Architectures", IEEE, pp. 80–85, 1992.*
Jeff Chase et al. "Some issues for Single Address Space Systems", IEEE, pp. 150–154, 1993.*
Jeffrey Chase et al, "Sharing and Protection in a Single–Address–Space operating System", ACM Transactions on Computer Systems, vol. 12, No. 4, pp 271–307, 1994.*
"SPARC Reference MMU Arthitecture", SUN Microsystems, Version 8 (Dec. 11, 1990), pp. 237–255).
"Structured Computer Organization", 2nd Ed., Andrew S. Tanenbaum, Prentice/Hall International, Inc., pp. 308–341.
"i486 Microprocessor", Intel.

* cited by examiner

*Primary Examiner*—St. John Courtenay, III
(74) *Attorney, Agent, or Firm*—John Vodopia (57) ABSTRACT

An operating system that provides protection domain support is arranged so to be compatible with "well behaved" threads, i.e., threads that obtain all their memory allocations from the operating system, that were written without regard for protection domains. This may be achieved by associating each protection domain with one or more pages of memory, so-called "primary memory pages", for which the protection domain has read and write access permission. Requests by such a "protection-domain-unaware" thread to the operating system for a memory allocation, e.g., for memory in which to create a data structure, are automatically fulfilled by the operating system from the memory available in the primary memory pages of the protection domain of the requesting thread. The operating system informs the thread of the location of the created data structure, e.g., by passing to the thread a pointer to the data structure. Note that threads may have read and/or write access to memory pages that are not primary pages for their protection domains. Thus, the operating system controls 1) the access permission for each page; 2) the allocation for use as primary pages of pages from "free memory" pages, e.g., memory pages available in the system domain; and 3) which particular pages are primary pages for each protection domain at any particular time.

24 Claims, 6 Drawing Sheets

OPERATING SYSTEM FOR USE WITH PROTECTION DOMAINS IN A SINGLE ADDRESS SPACE

TECHNICAL FIELD

This invention relates to the field of computer operating systems, and in particular, to the area of real-time operating systems in embedded computing environments.

BACKGROUND OF THE INVENTION

Computer operating systems such as UNIX provide a sophisticated degree of protection among processes concurrently executing on the system. A process is defined as a program in execution which utilizes system resources, such as memory and computing time. At each step of execution the process generates the address or addresses, in memory which is needed to successfully execute the step, e.g., a) the address where an instruction to be executed is stored, b) the address where required data is to be found, or c) the address where output data is to be stored. The range of addresses that a computer can generate defines its address space.

Under control of a conventional operating system, e.g., UNIX, the addresses generated by a process do not directly address a location in the computer's physical memory. Instead, the addresses generated by the process are translated to a physical location using well known virtual memory techniques. A description of virtual memory can be found in the book "Operating Systems Concepts", by Peterson and Silbersatz. Each process executes its steps and generates addresses as if it is executing on its own private computer which has a very large memory. The size of the memory on this virtual private computer is the size of the process' address space. The addresses generated by the process in this virtual memory are translated to physical memory locations, also known as real memory addresses, using a page table mechanism, typically implemented in a memory management unit (MMU). Thus, each process is provided a different address space, which is mapped onto the real memory. The MMU translations are briefly described below.

The physical memory is divided into fixed units called pages. The page size is determined by the hardware architecture of the processor. The address space of each process is also divided into pages, each having the same size as a page of the physical memory. For each process, a page table is maintained in memory by the operating system which contains a mapping of the page number in the address space to the page number in the physical memory. The page table also contains some attributes bits for each page. The attribute bits indicate a) whether the page with which they are associated is valid or invalid, i.e., whether or not the associated page has a corresponding page in physical memory, and b) if the process has permission to read or to modify the contents of the page.

When an address is generated by a process, the MMU first looks up the page table in the memory and determines the corresponding physical page in the memory. The permissions for the page are also checked during the look up process to verify that the process is authorized to access the memory in the manner, e.g., read or write, that it is attempting. The physical page number is attached to the offset of the address within the page and a new physical address is generated. The physical address is then used to look up the contents of the memory. Thus, each memory access translates into two sequential accesses, the first one for generating the physical address and checking the validity, with the second one being for actually accessing the physical memory.

The two accesses are usually expedited by means of caching techniques, in which frequently used areas of the page tables (and memory) are stored in a smaller higher speed memory called a cache so as to reduce the probability of actually accessing the physical memory.

One of the advantages of going through a page table is that processes can execute relatively independent of each other. A process has exclusive access to its address space and no other process can modify the contents of the address space, unless the process explicitly provides access to parts of its address space to other processes.

In a system with multiple concurrent processes, switching between processes is a complex, and so "expensive" in processing terms, operation. A process may be further broken down into several threads, each thread being a sequence of executing instructions. All threads within a process execute in the same address space. As such, switching from the currently active thread to another thread is a relatively simple and inexpensive operation. However, all threads have identical privileges to all of the address space of the process to which they belong, and so there is no protection among threads executing in the same address space.

In the area of embedded systems, such as 1) digital television receivers, 2) television set top units, and 3) network switch controllers, there is only one process in the entire system. This process may consist of multiple concurrent threads. However, typically, there is no support for virtual memory because such systems have only so-called "primary memory", e.g., RAM, ROM or combination thereof, and no so-called "secondary storage", e.g., a disk. Thus, all the threads have access to the entire memory, including data structures maintained by the operating system.

This global access is a serious problem in the development and debugging of embedded system software. For example, an errant thread, e.g., one still under development, can alter a data structure or code used by an already debugged and "trusted" thread. The trusted code will eventually be affected by the corruption of its data structure or code, and either generate an error or behave unexpectedly. It is very difficult to determine the cause of the problem in such an environment, since the point in the code at which the software crashes or generates a warning is unrelated to the point in the code that caused the problem.

An identical problem exists in digital television receivers which are used for the downloading of multiple applications from a server. The downloaded application may cause the receiver to crash, and it is difficult to isolate the cause of the fault, which could lie in the downloaded application software, the operating system software, or any other supporting library. When the software in the embedded system originates from multiple program development organizations that are cooperating, it is difficult to isolate the cause of the problem. As a result, each organization typically blames the other for the failure.

In embedded systems where an MMU is present, groups of threads can be logically clustered into processes, which are each provided their own address space using MMU page mapping. In this manner, different threads can be provided isolation from one another. In some systems, the MMU is preloaded so that the physical page numbers correspond to the virtual page numbers and the physically generated address is identical to the virtual address. Unfortunately, the cost of having an MMU is usually unacceptable in an embedded system. In those cases, there is no protection provided among the threads.

We have realized that, from both the debugging and development perspective, providing protection among threads executing in the same address space is an attractive idea. Thus, in concurrently filed application Serial No. (case PHA 23-102), assigned to the same assignee as the present application, protection among threads executing in the same address space of a computer system is provided without using virtual memory techniques that require each thread actually, or logically, to be isolated in its own, separate address space. This is achieved by grouping the threads into protection domains, each of the threads in a protection domain having the same rights to access memory as the other threads in that protection domain, so that each thread in a protection domain can access all the information available to the others. At least one protection domain, referred to herein as the "system" domain, which typically is the protection domain of the operating system and has unrestricted access to the entire memory, is predefined prior to execution of any threads. The protection domains, including the system domain, may spawn additional protection domains. However, the total number of protection domains is typically limited to a predetermined maximum number. Also prior to execution, the single address space, which is typically physical memory only and is common to all of the threads, is divided into pages, which typically do not overlap. Each page, either prior to or during execution, has at least one access permission set for it, e.g., on a protection domain-by-protection domain basis or on an exception basis. Only threads that belong to a protection domain having permission to access a page may do so. Permission for read access and write access to each page may be separately specified.

During operation, when a request to access memory is issued by an executing thread, it is determined whether or not the protection domain of the executing thread has permission to perform the requested type of access. If the protection domain of the executing thread is permitted to perform the type of access requested, access is granted and the executing thread's execution proceeds normally. However, if the protection domain of the executing thread does not have permission to perform the requested type of access, a protection fault is generated.

It is preferable to identify the protection domain of the currently executing thread prior to the memory access. Such identification may be performed each time memory is accessed or each time the thread is changed.

A problem with the foregoing approach to providing protection among threads executing in the same address space relates to the compatibility of such a system with already written, protection-domain-unaware, threads. In particular, all objects created by such a system must be stored somewhere in memory. More specifically, objects must be stored in memory pages that are accessible by the thread, or threads, which require and can manipulate them. One method that can be used to select the pages of memory in which to create an object is an augmented operating system call. In particular, the operating system call is augmented so as to indicate the protection domains which can have access to the object being created. However, this approach suffers from the serious drawback of being incompatible with threads written prior to implementation of the protection domain system. This is because threads written prior to implementation of the protection domain system do not include augmented system calls. Consequently, if augmented system calls were the only way to access memory, such protection domain-unaware threads could not access any memory, and so could not execute.

SUMMARY OF THE INVENTION

This drawback is overcome, in accordance with the principles of the invention, by an operating system that provides protection domain support which is arranged to be compatible with "well behaved" threads, i.e., threads that obtain all their memory allocations from the operating system, that were written without regard for protection domains. For example, this may be achieved by associating each protection domain with one or more pages of memory, so-called "primary memory pages", for which the protection domain has read and write access permission. Requests by such a to the operating system for a memory allocation, e.g., for memory in which to create a data structure, are automatically fulfilled by the operating system from the memory available in the primary memory pages of the protection domain of the requesting thread. The operating system informs the thread of the location of the created data structure, e.g., by passing to the thread a pointer to the data structure. Note that "protection-domain-aware" threads may have read and/or write access to memory pages that are not primary pages for their protection domains. Likewise, protection-domain-aware threads may also employ the primary pages technique for memory allocation.

Thus, the operating system controls 1) the access permission for each page; 2) the allocation for use as primary pages of pages from "free memory" pages, e.g., memory pages available in the system domain; and 3) which particular pages are primary pages for each protection domain at any particular time.

BRIEF DESCRIPTION OF THE DRAWING In the drawing.

DETAILED DESCRIPTION

Figure 1:
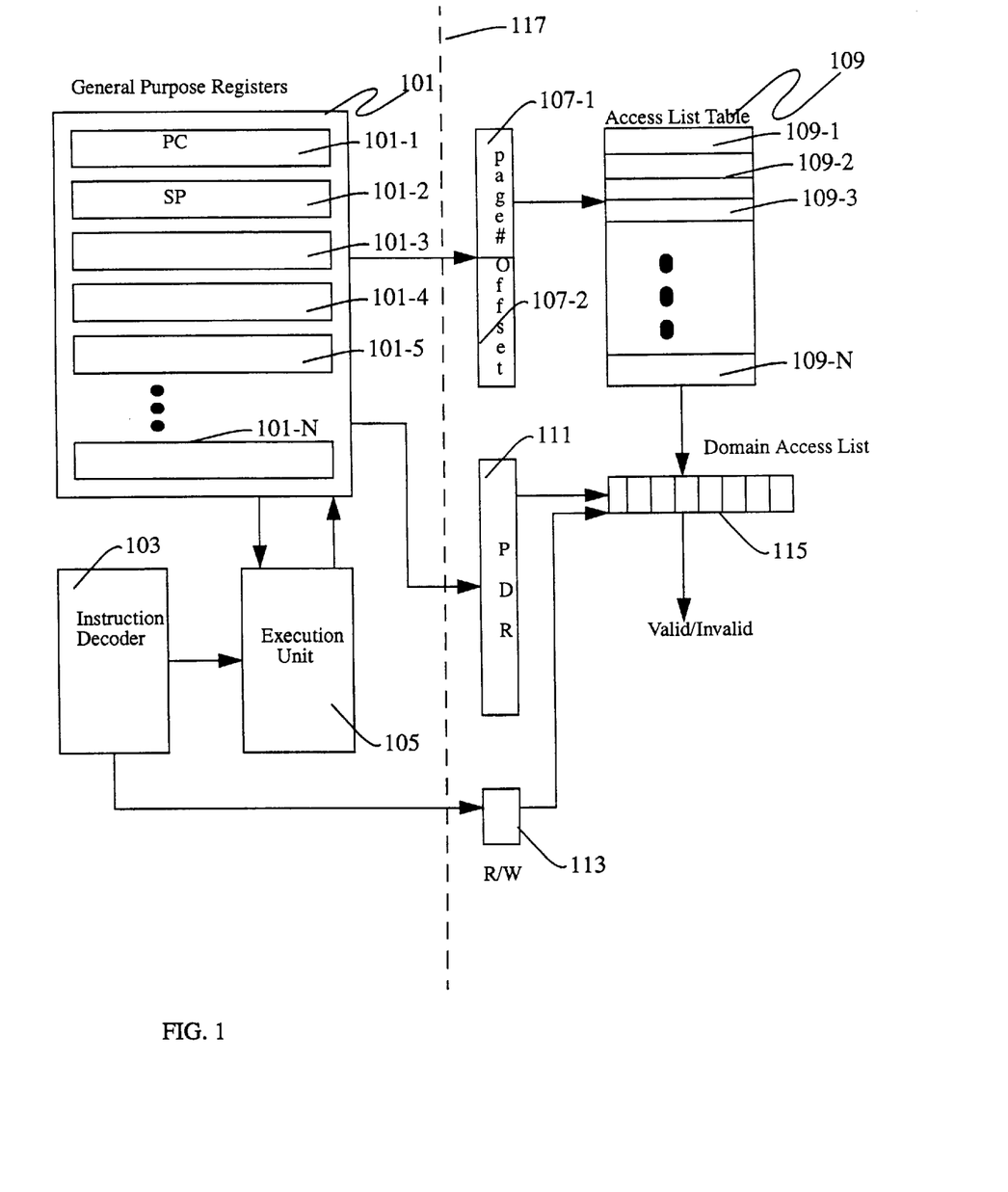
FIG. 1 shows a portion of the hardware architecture of a processor for use in practicing the invention.

FIG. 1 shows a portion of the hardware architecture of a processor for use in practicing the invention. As shown in FIG. 1, the portion of the architecture to the left of dashed line 117 is conventionally found in processors and is well known in the art while the portion of the architecture to the right of dashed line 117 is specific to the implementation of the invention. The architecture of FIG. 1 includes: a) general purpose registers 101, b) instruction decoder 103, c) execution unit 105, d) memory address register 107, e) access list table 109, f) protection domain register (PDR) 111, e) read/write (R/W) 113, and f) domain access list 115.

General purpose registers 101 include general purpose registers 101-1 through 101-N. Each of general purpose registers 101 is used by the processor for storing data, typically on a temporary basis, and executing instructions that require the data. Also, register 101-1 is the program counter (PC), which is used to point to the address of the next instruction to be executed while register 101-2 is the stack pointer (SP), which is used to point to locations at which context information is stored during subroutine execution. Each thread may maintain its own stack which, while the thread is executing, is pointed to by the thread's own stack pointer, which may be implemented using register 101-2.

Instruction decoder 103 receives instructions from memory (not shown) and decodes the instructions in the conventional manner. Instruction decoder 103 is coupled to execution unit 105 in order to supply control and other information to execution unit 105 for executing the received instructions. Execution unit 105 is coupled to general purpose registers 101 for manipulating data therein, including: 1) writing data to general purpose registers 101, 2) receiving information back from general purpose registers 101, and 3) performing other operations on the contents of general purpose registers 101.

Memory address register 107 stores the address of a memory request prior to that address being supplied to the address bus so that the validity of the memory access can be determined. Each memory address is arranged as a page number and an offset within the page, in the conventional manner. The number of a particular page being accessed is stored in page number 107-1 and the corresponding offset information is stored in offset 107-2. All of the addresses are within the same address space. Thus, identical memory addresses used by different threads, even when the different threads are in different protection domains, always correspond to the same physical memory location.

Access list table 109 contains the read/write access permissions for each page. In particular, each of the entries 109-1 through 109-N specifies the read/write permissions for one page of memory. Table 1 shows an exemplary embodiment of access list table 109 as shown in Table 1. The access list table is arranged so that its row index is the page number and its columns are indexed by a double index including the protection domain as primary index and whether the access is a read or a write as the secondary index. In other embodiments of the invention the read or write control may be unified so that it is identical for each protection domain, and, therefore, only one column need be stored for each protection domain.

In other embodiments of the invention, the access list table might group several pages into a common memory unit, so that all pages in the same memory unit have identical entries in the access list table.

TABLE 1

| Protection Domain | (System) 0 | | 1 | | ... | M | |
|---|---|---|---|---|---|---|---|
| Page # | R | W | R | W | ... | R | W |
| 0 | 1 | 1 | 0 | 0 | ... | 1 | 1 |
| 1 | 1 | 1 | 1 | 1 | ... | 1 | 1 |
| 2 | 1 | 1 | 1 | 1 | ... | 1 | 1 |
| 3 | 1 | 1 | 0 | 0 | ... | 0 | 0 |
| . | . | . | . | . | | . | . |
| . | . | . | . | . | | . | . |
| . | . | . | . | . | | . | . |
| N | 1 | 1 | 0 | 0 | ... | 0 | 0 |

Returning to FIG. 1, in the embodiment of the invention shown therein, the page number of the memory address to be accessed from page number 107-1 is used to index the pointer into access list table 109 and to determine a particular row of permissions. This row is then copied into domain access list 115 a register which stores one row of access list table 109.

Each time there is a context switch, i.e., another thread begins executing, protection domain register 111 is loaded with a value indicative of the protection domain of the new thread that is beginning to execute. Doing so is handled by the operating system, which has information indicative of the thread that is executing and the protection domain to which it belongs. In particular, the operating system conventionally maintains the identity of the currently active thread in a fixed memory location or register. Associated with each thread, the operating system conventionally maintains a thread-control block, which is a portion of memory containing information pertinent to the thread, and used by the operating system. The protection domain to which the thread belongs can be stored in the thread-control block, from where it can be readily accessed by the operating system. An alternate scheme would be to include the protection domain as part of the thread identifier, for example, the first few bits of a thread-identifier can indicate the correct protection domain.

Read/write flag 113 is loaded with a value indicative of whether a particular memory access is to be a read or a write. For example, a 0 can indicate a read and a 1 can indicate a write.

Once domain access lists 115 is loaded with the particular row from access list table 109 that corresponds to the page that is being accessed, 1) the value stored in PDR 111, which is indicative of the protection domain that is currently executing, and 2) the value of read/write 113, which indicates the type of access requested, are used to index into the value stored in domain access list 115. If the protection domain that is executing is entitled to perform the requested access, the value obtained from domain access list 115 will indicate that the access is valid, e.g., a logic 1. Otherwise, the value retrieved from domain access list will indicate that the access is invalid, e.g., a logic 0. Should an invalid access be detected a protection fault is generated, in accordance with the principles of the invention.

In another embodiment of the invention, a protection domain's access permissions may be determined by first indexing into access list table 109 using the value indicative of the current protection domain, which is stored in PDR 111, to extract the current protection domain's column of permissions for each memory page, and then using the value of page number 107-1 to determine the permissions for each particular page when it is accessed. Doing so allows a protection domain's column of permissions for each memory page to be extracted only when the protection domain is changed, rather than for every memory access, which results in greater speed. Also, advantageously, the columns that correspond to access list table 109 can be stored at independent locations in memory. Thus, the values indicative of the protection domains, e.g., which are loaded in PDR 111, can be the addresses of the memory locations at which is stored the beginning of each of the columns of access list table 109.

Figure 2:
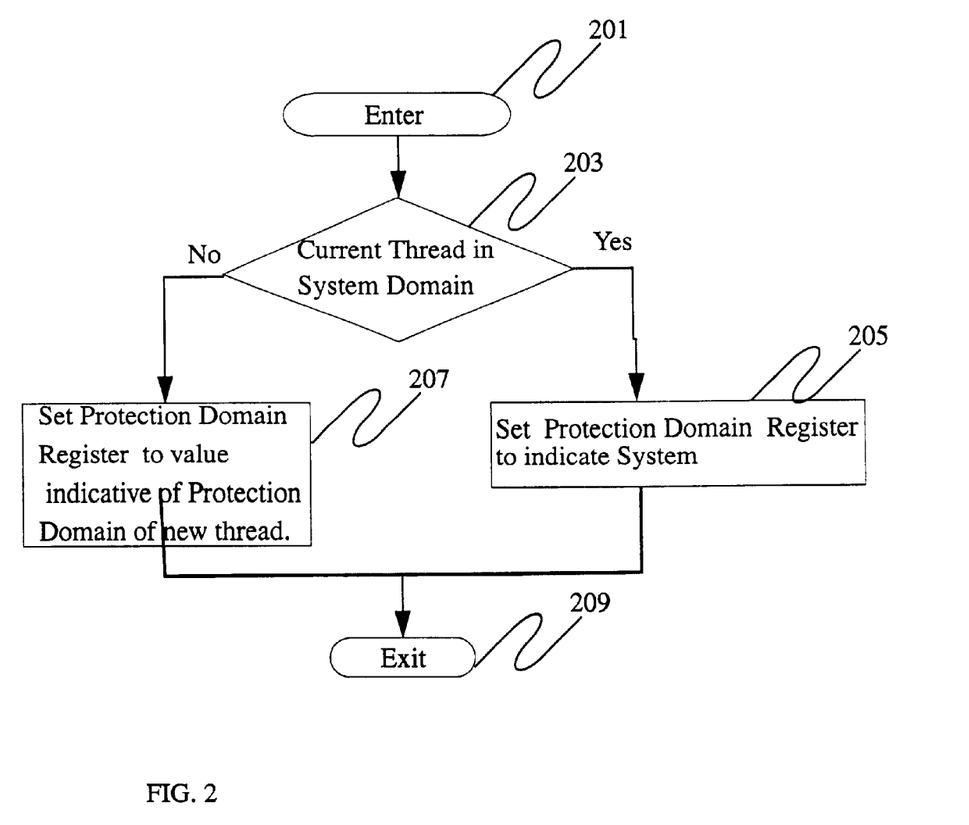
FIG. 2 shows a flow chart of an exemplary process for setting the value of the protection domain register when there is a switch from one thread to another in accordance with an aspect of the invention.

FIG. 2 shows a flow chart of a exemplary process for setting the value of the protection domain register when there is a context switch, i.e., a switch from one thread to another, in accordance with an aspect of the invention. In particular the process is entered in step 201, upon the occurrence of a context switch, e.g., the time period allotted to a particular thread that has been executing is over and, therefore, the operating system stops execution of that particular thread and initiates the execution of another thread. Next, conditional branch point 203 tests to determine if the thread whose execution is being initiated is in the protection domain of the operating system. If the test result in step 203 is YES, control passes to step 205, in which the operating system sets the PDR to indicate system. The process then exits in step 209. If the test result in step 203 is NO, control passes to step 207, in which the PDR is set to a value indicative of the protection domain of the new thread. The process then exits in step 209. According to the embodiment of the invention described above in which access list table 109 is indexed into first by column, the value indicative of the protection domain to which the PDR is set in step 207 is the first address of the column of access list table 109 for the protection domain.

Figure 3:
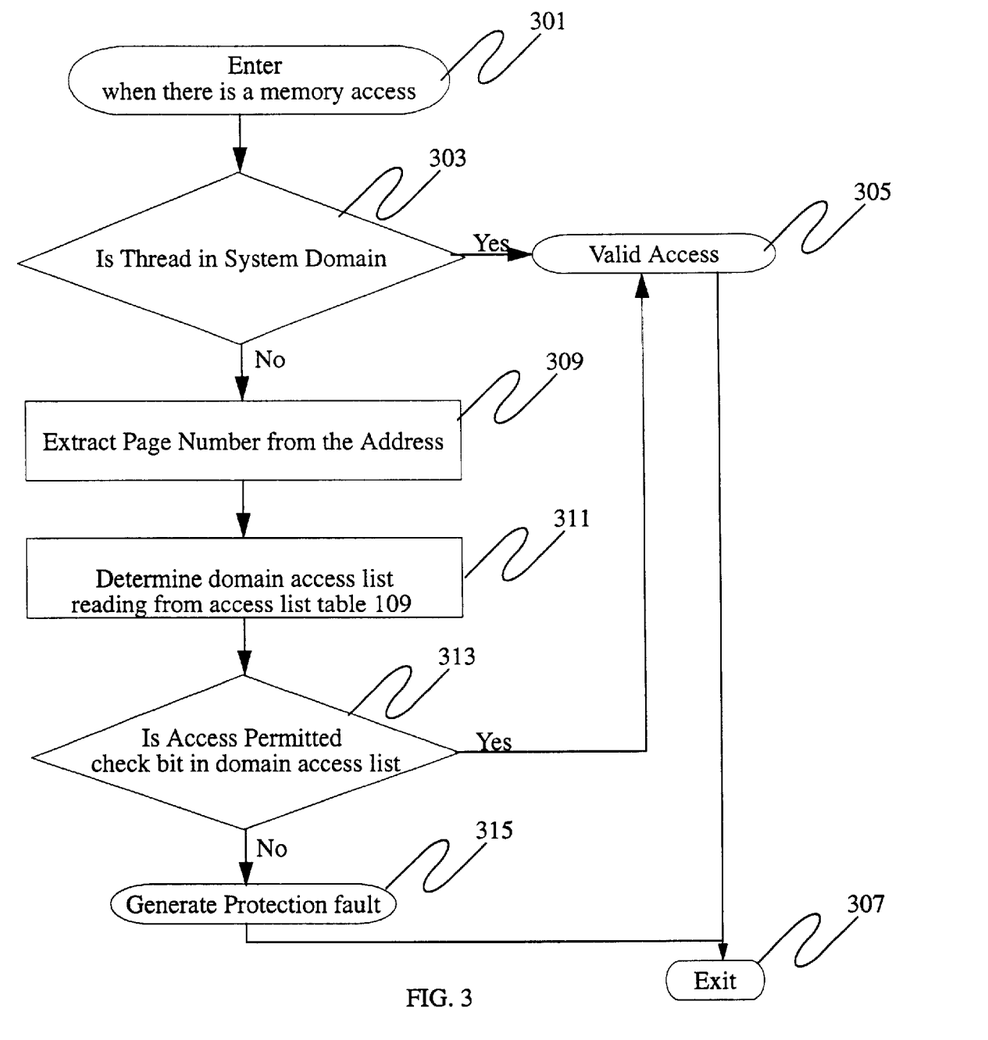
FIG. 3 shows an exemplary process for determining whether a particular access to memory is valid, in accordance with an aspect of the invention.

FIG. 3 shows an exemplary process for determining whether a particular access to memory is valid, in accordance with an aspect of the invention. The process is entered in step 301, when a thread attempts to access a memory location. Conditional branch point 303 tests to determine if the currently executing thread is in the protection domain of the operating system. If the test result in step 303 is YES, the access is valid because the protection domain of the operating system encompasses the entire memory and has access to all of memory. Therefore, control passes to step 305 and the access proceeds as requested. The process then exits in step 307.

If the test result in step 303 is NO, control passes to step 309, in which the page number is extracted from the address supplied by the thread for the memory access. Next, in step 311, the domain access list is determined by reading from the access list table the value pointed to by the page number in which the memory access is requested. Thereafter, conditional branch point 313 tests to determine if the current domain has access to the requested page, e.g., by checking the value of the bit in the domain access list that corresponds to the type of access requested for the domain of the executing thread. If the test result in step 313 is YES, the memory access is valid and permitted. Therefore, control passes to step 305, and the process continues as described above. If the test result in step 313 is NO, the access is not permitted and is invalid. Therefore, control passes to step 315, in which a protection fault is generated. The process then exits in step 307.

Figure 4:
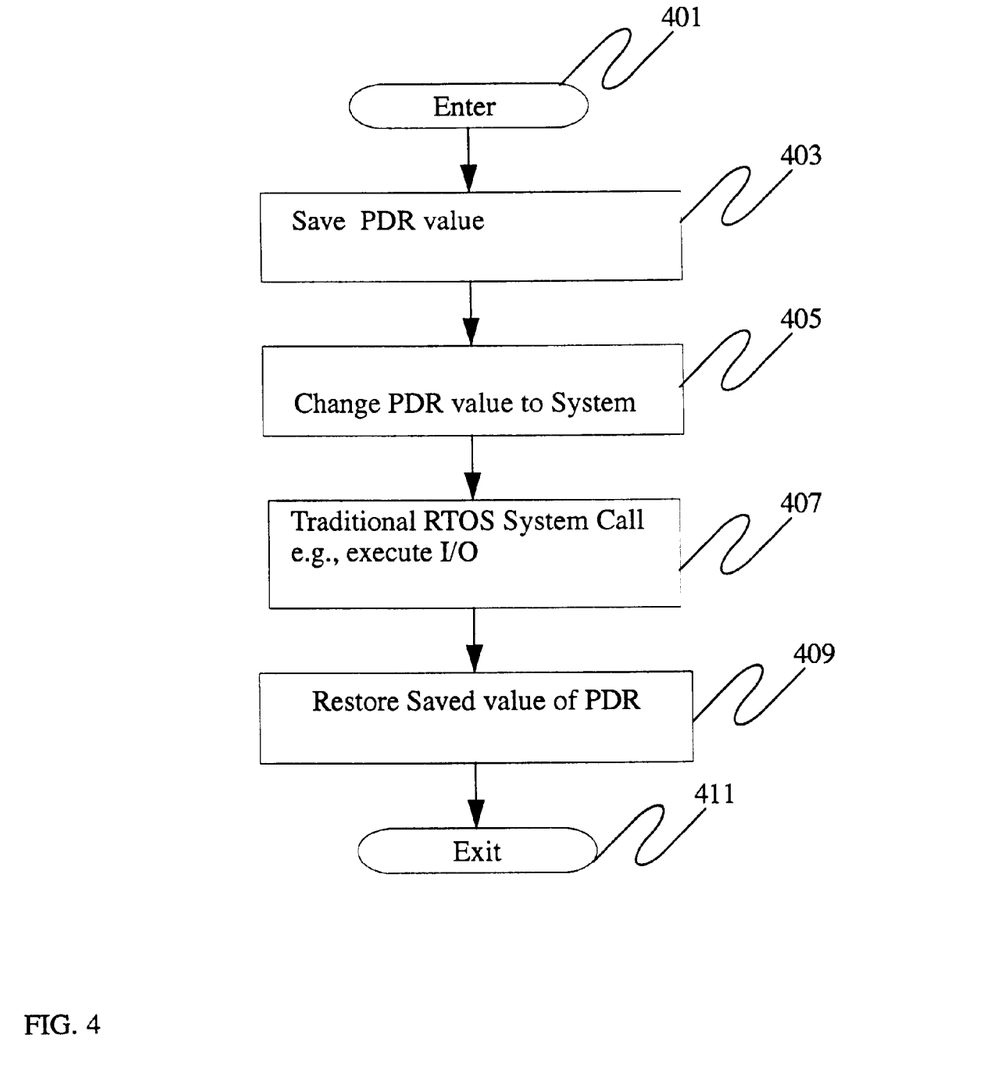
FIG. 4 shows an exemplary process for the handling of an operating system call by a currently executing thread, in accordance with an aspect of the invention.

FIG. 4 shows an exemplary process, in accordance with an aspect of the invention, for handling the issuance, by a currently executing thread, of an operating system call, i.e., a request by an executing thread for a service provided by the operating system, e.g., writing particular information to a specified display device.

The process is entered in step 401 upon a call by the currently executing thread to the operating system for service. In step 403, the value of the protection domain register is stored into a predetermined location in memory, e.g., on the stack of the currently executing thread, the next available address of which is pointed to by the thread's stack pointer. Thereafter, in step 405, the value of the protection domain register is changed from the value of the executing thread which is issuing the operating system call to the value of system, as described above. Next, in step 407, a traditional real time operating system call is performed. For example, the context is switched to the operating system and the particular information that had been specified by the thread is written to and displayed on a screen by the operating system. As part of completing the call, the context is restored to the previously executing thread by the operating system, in the conventional manner.

Upon completion of the operating system call control passes to step 409, in which the value of the previously stored protection domain register is retrieved, e.g., popped from the stack, and restored in the PDR, in accordance with an aspect of the invention. Thereafter the process exits in step 411.

The system described above is further assisted by an operating system interface that permits applications to create and manipulate protection domains. In general, conventional operating system interfaces provide several operating system calls, which, when invoked by an application, perform specific, predefined tasks for that application. These tasks often include a) creation and/or manipulation of a thread, b) facilitation of inter-thread communication, and c) creation, use and modification of inter-thread synchronization objects, e.g., message queues, semaphores, or the like.

Some objects may be created for the exclusive use of threads in a particular protection domain. Such objects are created in pages for which only the object creating the protection domain has permission to access. Alternatively, other objects may be created so that they can be used by threads in the protection domain of the creating thread as well as threads in other protection domains, e.g., a message queue by which threads in one protection domain send requests to threads in another protection domain. Such objects are created in a memory page that is a primary memory page of the protection domain of the creating thread but for which one or more other protection domains have permission to access that page, e.g., according to the access list table.

All objects created by the system must be stored somewhere in memory. In particular, objects must be stored in memory pages that are accessible by the thread, or threads, which require and can manipulate them. One method that can be used to select the pages of memory in which to create an object is an augmented operating system call. In particular, the operating system call is augmented so as to indicate the protection domains which can have access to the object being created. This approach has the drawback of not being backward compatible, in that software developed prior to implementation of the protection domain system can not be reused.

In accordance with an aspect of the invention, new operating system calls are added which implement protection domains in a manner that is transparent to existing software. Advantageously, existing operating system calls need not be changed. To achieve this, the operating system associates a set of memory pages with each protection domain. Any executing thread of a protection domain at least has access to the primary memory pages associated with the protection domain to which the thread belongs. When a conventional operating system call that requires memory is made by a thread, the memory required for the operating system call is allocated from the primary pages that are associated with the protection domain of the thread.

Each protection domain may be able to access other memory pages that are not associated therewith as a primary memory page provided it has permission to do so. The operating system also contains a function that permits a thread to change the set of primary pages for its protection domain. However, a thread can change the primary pages of its protection domain, e.g., via the operating system, only to those pages that the protection domain has both read and write access permission. Only a protection-domain-aware thread is capable of doing so.

Table 2 shows an exemplary primary pages table. The data shown within the table is strictly for pedagogic purposes to give a feel for one arrangement of the table. Note that, at the discretion of the implementor, the same memory page may be associated as a primary page for more than one protection domain.

TABLE 2

| Protection Domain | Primary Pages |
| --- | --- |
| 0 (System) | 0, 1, 2, 5, ... , M |
| 1 | 8, 9, 10, 15, 16, 22 |
| . | |
| . | |
| . | |
| N | 3, 7, 11, 82, 89, 105 |

Figure 5:
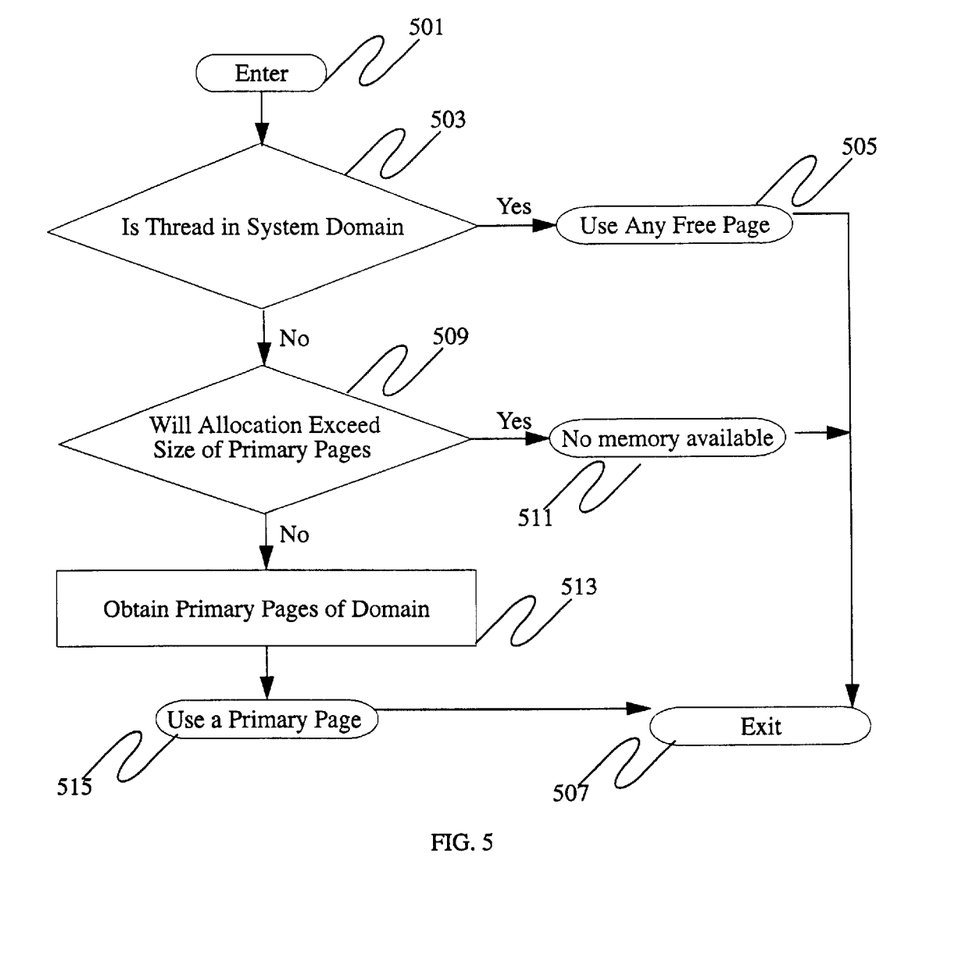
FIG. 5 shows an exemplary process by which memory is allocated for a conventional operating system call in a system employing protection domains, in accordance with the principles of the invention.

FIG. 5 shows an exemplary process by which memory is allocated for a conventional operating system call when protection domains are employed, in accordance with the principles of the invention. The process is entered, in step 501, when a request for an allocation of memory is received from an executing thread. Conditional branch point 503 tests the value of the PDR to determine if the requesting thread is in the protection domain of the operating system. If the test result in step 503 is YES, control passes to step 505, in which the required memory is allocated from the available free pages, e.g., those pages not assigned as primary to anyone or those pages which are unused but are assigned as primary to the system protection domain. The process is then exited in step 507.

If the test result in step 503 is NO, indicating that the requesting thread is not in the protection domain of the operating system, conditional branch point 509 tests to determine if allocating the extra memory would cause the resulting total amount of memory allocated to the protection domain of the requesting thread to exceed the amount of memory available to that protection domain's primary pages. If the test result in step 509 is YES, indicating that allocating the extra memory would cause the available memory to be exceeded, the memory allocation is denied in step 511. The process is then exited in step 507. If the test result in step 509 is NO, indicating that the memory available to the protection domain of the thread will not be exceeded by allocating the requested memory, then the particular primary pages of memory for the thread's protection domain are determined in step 513, and the requested memory is allocated therefrom in step 515. The process then exits in step 507.

In other embodiments of the invention, memory may be pre-allocated for segments from the system memory, or pages may be brought into the primary set on a demand-basis from the system memory. In still other embodiments of the invention, all threads can only access memory locations that are within memory pages that are primary pages for the protection domain of the thread. For non-protection-domain-aware threads such an embodiment of the invention operates the same as described above. However, operation is different for protection-domain-aware threads. Such protection-domain-aware threads that require access to memory locations that are not primary pages for the thread's protection domain must first instruct the operating system to make any such pages primary for the thread when it requires access.

Figure 6:
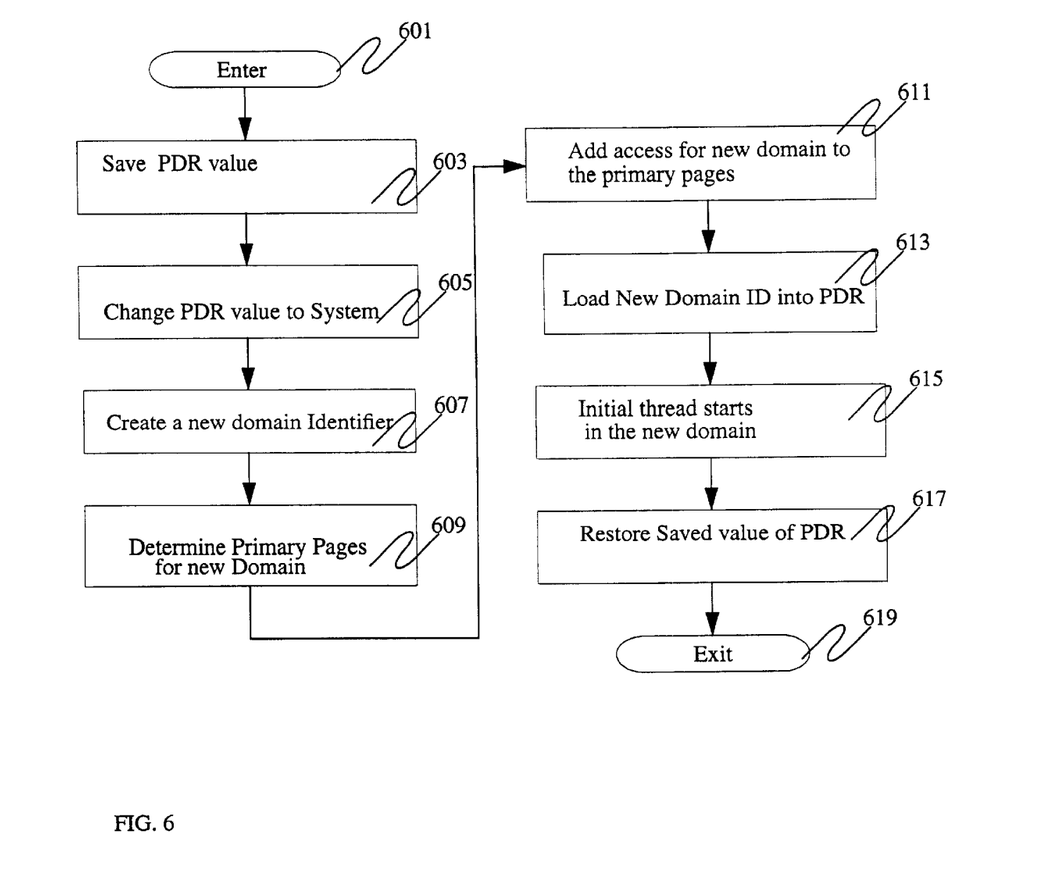
FIG. 6 shows an exemplary process by which a new protection domain is created, in accordance with an aspect of the invention.

FIG. 6 shows an exemplary process by which a new protection domain is created, in accordance with an aspect of the invention. This process is typically performed only by protection-domain-aware threads. The protection domain creation process is entered in step 601 upon the issuance of an operating system call by a thread requesting the creation of a protection domain with certain attributes. For example, the operating system call may specify the number of primary memory pages to be associated with the protection domain to be created, as well as the location and attributes of the first thread to be created therein. In step 603, the current value of the PDR is stored for later use, e.g., on the creating thread's stack, and in step 605 the value of the PDR is changed to that of system.

Next, in step 607, the system assigns a new identifier, i.e., a value that can be stored in the PDR, for use in identifying the protection domain being created. In step 609, the system determines the initial set of primary pages to be assigned to the new protection domain. Thereafter, in step 611, the permissions for the initial set of primary pages of the new protection domain are set in the access list table. In step 613, the new domain identifier is loaded into the PDR, thus designating the newly created protection domain as the currently executing protection domain. Subsequently, in step 615, the first thread of the newly created protection domain begins executing. Steps 613 and 615 may be performed by storing the new domain identifier on the stack of the first thread of the newly created protection domain and then performing a context switch from the operating system to that first thread.

When the creating thread begins execution again, the previously stored value of the old PDR is retrieved, e.g., it is popped off its stack, and replaced in the PDR in step 617. Eventually, the process exits in step 619.

Those of ordinary skill in the art will recognize that the foregoing process may be arranged according to the requirements of the application. For example, the creating thread may continue to execute after creation of the new protection domain and a thread of the new protection domain only later begins execution when certain predefined conditions are met.

In other embodiments of the invention, association of primary pages may be done, fully or partly, on a per-thread basis.

Given the foregoing, in addition to creating protection domains, those of ordinary skill in the art will be able to develop processes that manipulate and destroy protection domains.

The foregoing merely illustrates the principles of the invention. It will thus be appreciated that those skilled in the art will be able to devise various arrangements which, although not explicitly described or shown herein, embody the principles of the invention and are thus within its spirit and scope.

What is claimed is:

1. A method for use by an operating system of a computer that is controlling a single address space in which various threads execute, the threads being grouped into protection domains, the method comprising the steps of:

associating one or more memory pages with a protection domain as at least one set of primary memory pages for the protection domain;

receiving a request for memory from a thread of the protection domain; and allocating memory to satisfy the memory request only from the protection domain's at least one set of primary pages.

2. The invention as defined in claim 1 wherein the memory pages for association with a protection domain are allocated only when the protection domain has access permission to the memory pages.

3. The invention as defined in claim 1 wherein the associating step is performed only when the protection domain has access permission for the memory pages being associated.

4. The invention as defined in claim 1 wherein the memory pages for association with a protection domain are allocated from memory available only to the operating system.

5. The invention as defined in claim 1 wherein the allocating step is performed only when there is sufficient available memory in the primary pages of the protection domain of the requesting thread to satisfy the memory request.

6. The invention as defined in claim 1 wherein the associating is performed for at least one protection domain other than the operating system domain prior to the execution of any thread of any protection domain other than the operating system.

7. The invention as defined in claim 1 wherein the associating is performed after execution of a thread of a protection domain other than the operating system.

8. The invention as defined in claim 1 wherein the method is performed only for protection-domain-unaware threads.

9. The invention as defined in claim 1 wherein the associating is performed in response to a request by a thread of a protection domain other than the operating system.

10. The invention as defined in claim 1 wherein the associating is performed by associating the one or more memory pages as primary pages for a particular thread in said protection domain.

11. The invention as defined in claim 1 wherein the associating is performed by associating the one or more memory pages as primary pages for a particular thread in said protection domain and wherein the allocating step is performed only when there is sufficient available memory in the primary pages of the requesting thread to satisfy the memory request.

12. The invention as defined in claim 1 wherein the associating is performed in response to an explicit request by a protection-domain-aware thread of a protection domain other than the operating system.

13. The invention as defined in claim 12 wherein the protection-domain-aware thread explicitly specifies at least one page for which the association is established.

14. The invention as defined in claim 13 wherein an association of the specified at least one page with another protection domain must be deleted prior to establishing the association of the protection-domain-aware thread and the explicitly specified at least one page.

15. A method for use by an operating system of a computer that is controlling a single address space in which various threads execute, the threads being grouped into protection domains wherein one or more memory pages are associated with a protection domain as primary memory pages for the protection domain, the method comprising the steps of:

receiving a request from a thread of the protection domain to allocate a data structure; and allocating the requested memory only when the data structure can be contained within the protection domain's primary pages.

16. The invention as defined in claim 15 wherein the memory pages associated with a protection domain are so associated only when the protection domain has access permission to the memory pages.

17. A system for executing threads in a single address space in which various threads execute, the threads being grouped into protection domains and the address space being divided into memory pages, the system comprising:

memory means for storing associations between protection domains and memory pages so that any memory page associated with any particular protection domain is a primary memory page for the particular protection domain; and means for allocating memory to a thread of a protection domain, in response to a request therefor by the thread, only from those memory pages that are primary memory pages of the protection domain of the requesting thread.

18. The invention as defined in claim 17 wherein at least one particular thread may request access to a memory location that is not within a memory page that is primary for the requesting thread, the system further comprising:

means for storing page-by-page memory page access permissions as a function of the protection domains; and means for generating a protection fault substantially concurrently with said access request by the at least one particular thread when the stored access permissions do not indicate a valid permission for the protection domain of the particular requesting thread.

19. A system according to claim 17, wherein said system is an embedded system without an MMU.

20. A method for use by an operating system of a computer that is controlling a single address space in which various threads execute, one or more memory pages being associated with a thread as primary memory pages for the thread, the method comprising the steps of:

receiving a request from a thread of the protection domain to allocate a data structure; and allocating the requested memory only when the data structure can be contained within the thread's primary pages.

21. A system for executing threads in a single address space in which various threads execute, the threads being grouped into protection domains and the address space being divided into memory pages, the system comprising:

memory means for storing associations between threads and memory pages so that any memory page associated with any particular thread is a primary memory page for the particular thread; and means for allocating memory to a thread, in response to a request therefor by the thread, only from those memory pages that are primary memory pages of the requesting thread.

22. A system according to claim 21 wherein said system is an embedded system without an MMU.

23. A method for use by a system of an embedded computer system without an MMU that is controlling a single address space in which various threads execute, the threads being grouped into protection domains, the method comprising the steps of:

associating one or more memory pages with a protection domain as at least one set of primary memory pages for the protection domain;

receiving a request for memory from a thread of the protection domain; and allocating memory to satisfy the memory request only from the protection domain's at least one set of primary pages.

24. A method for use by an operating system of an embedded computer system without an MMU that is controlling a single address space in which various threads execute, the threads being grouped into protection domains wherein one or more memory pages are associated with a protection domain as primary memory pages for the protection domain, the method comprising the steps of:

receiving a request from a thread of the protection domain to allocate a data structure; and allocating the requested memory only when the data structure can be contained within the protection domain's primary pages.

* * * * *